(12) United States Patent
Xiang et al.

(10) Patent No.: US 11,237,122 B2
(45) Date of Patent: Feb. 1, 2022

(54) METHOD AND APPARATUS FOR RAPID MEASUREMENT OF HEAT CAPACITY OF A THIN FILM MATERIAL

(71) Applicants: Xiao-dong Xiang, Danville, CA (US); Yuewei Wu, Ningbo (CN); Xiao-ping Wang, Shanghai (CN)

(72) Inventors: Xiao-dong Xiang, Danville, CA (US); Yuewei Wu, Ningbo (CN); Xiao-ping Wang, Shanghai (CN)

(73) Assignee: NINGBO GALAXY MATERIALS TECHNOLOGY CO. LTD., Ningbo (CN)

( * ) Notice: Subject to any disclaimer, the term of this patent is extended or adjusted under 35 U.S.C. 154(b) by 217 days.

(21) Appl. No.: 16/365,318

(22) Filed: Mar. 26, 2019

(65) Prior Publication Data
US 2019/0391094 A1   Dec. 26, 2019

Related U.S. Application Data

(60) Provisional application No. 62/648,703, filed on Mar. 27, 2018.

(51) Int. Cl.
*G01N 25/00* (2006.01)
*G01N 25/18* (2006.01)
*G01K 1/143* (2021.01)

(52) U.S. Cl.
CPC .......... *G01N 25/005* (2013.01); *G01N 25/18* (2013.01); *G01K 1/143* (2013.01)

(58) Field of Classification Search
USPC .............................. 374/43, 29, 100, 120, 130
See application file for complete search history.

(56) References Cited

U.S. PATENT DOCUMENTS

2019/0391095 A1*  12/2019  Xiang .................... G01N 25/18

OTHER PUBLICATIONS

Chinese Office Action, dated Aug. 9, 2019, in a counterpart Chinese patent application, No. CN 201711165318.5.

(Continued)

*Primary Examiner* — Mirellys Jagan
(74) *Attorney, Agent, or Firm* — Chen Yoshimura LLP

(57) ABSTRACT

The invention discloses a apparatus and a method for rapid measurement of heat capacity of a thin film material. Specifically, the apparatus comprises a control device, a clock synchronizer, a flat peak laser device, a rapid thermometer and a heat capacity output device; the control device and the clock synchronizer are signally connected, and the clock synchronizer is signally connected to the flat peak laser device and the rapid thermometer; In the working state, the control device sends a start signal to the clock synchronizer, and the flat peak laser device and the fast thermometer coordinately cooperate; the flat peak laser device irradiates a laser with a spatially flat peak to the surface of the sample; At the same time, the rapid thermometer captures the surface temperature of the sample at a certain point in time during the heating process of the sample, and inputs the measured data into the heat capacity output device to obtain the desired heat capacity parameter. The device of the invention has simple structure, high efficiency and accuracy, and can provide reliable parameter data for the current thermal property setting of various ultra-thin semiconductor films.

10 Claims, 3 Drawing Sheets

(56) References Cited

OTHER PUBLICATIONS

Chinese Office Action, dated Feb. 6, 2020, in a counterpart Chinese patent application, No. CN 201711165318.5.
Cai An, "Research on the Thermophysical Properties and New Measuring Apparatus Development for Thin Films", A Dissertation Submitted to Shanghai Jiaotong University for the Degree of Doctor of Philosophy, Aug. 15, 2013, published in China Doctoral Dissertations Full-text Database, Engineering vol. I, pp. B020-323.

* cited by examiner

METHOD AND APPARATUS FOR RAPID MEASUREMENT OF HEAT CAPACITY OF A THIN FILM MATERIAL

FIELD OF THE INVENTION

This invention relates to the field of thermal measurement, and particularly relates to an apparatus and method for rapid measurement of heat capacity of a thin film material.

BACKGROUND

The deposition of the thin film material on the substrate by physical or chemical means, since the dimension of the substrate in the thickness direction is usually hundreds or even thousands of times larger than the thickness of the film, the measurement of the thermal properties of the thin film material becomes a problem.

Conventional heat capacity measurement techniques, such as differential scanning calorimetry (DSC) and hot plate methods, typically measure only a single block of a sample and cannot measure a thin film sample with a substrate.

The hot grid method and the delay method are newly developed methods for measuring the heat capacity of thin film materials by using laser technology. The principle of the thermal grid method is to use a coherent laser to form a thermal grating on the surface of the film. The temperature causes a change in the thermal grating. The low energy HE-NE laser is used to measure the change time of the grating to calculate the thermal parameter of the material. The principle of the delay method is to use a laser to heat the upper surface of the film, and another low-energy laser monitors the change in reflectivity on the lower surface to obtain the time it takes for the heat to penetrate the coating. The delay method utilizes the transient propagation time of heat in the thickness direction of the film. The physical quantities directly measured by these two methods are the thermal diffusivity or thermal conductivity of the material, and the heat capacity is calculated by a certain physical relationship.

Although the deposition technique of industrial thin films has been widely used, there are still many difficulties in measuring the thermal properties of thin films deposited on the surface of substrates, and there is no new apparatus and method for measuring the heat capacity of thin film materials in the art.

SUMMARY

The object of the invention is to provide an apparatus and method for rapid measurement of heat capacity of a film material. The invention combines the laser heating technology with the high-speed temperature measuring technology to realize the measurement of the heat capacity of the thin film material. The apparatus and method of the invention has simple structure and high efficiency and accuracy. It can provide reliable parameter data for the thermal properties of various current ultra-thin semiconductor films.

The first aspect of the invention provides an apparatus for rapid measurement of heat capacity of a film material, in particular, the apparatus comprises a control device, a clock synchronizer, a flat peak laser device, a rapid thermometer and a heat capacity output device; the control device and the clock synchronizer are signally connected, and the clock synchronizer is signally connected to the flat peak laser device and the rapid thermometer; in the working state, the control device sends a start signal to the clock synchronizer, and the flat peak laser device and the fast thermometer coordinately cooperate; the flat peak laser device irradiates a laser with a spatially flat peak to the surface of the sample; at the same time, the rapid thermometer captures the surface temperature of the sample at a certain point in time during the heating process of the sample, and inputs the measured data into the heat capacity output device to obtain the heat capacity parameter.

In some embodiments, the flat peak laser device comprises a laser, a beam expander, a beam shaper, and a focusing lens.

In some embodiments, a laser is emitted from the laser, the laser first passes through the beam expander, the laser light intensity is reduced, and then the laser passes through the beam shaper, and the energy spatial distribution of the laser is shaped from a Gaussian spatial distribution to a flat peak spatial distribution, and the laser finally passes through the focusing lens and illuminates the surface of the sample.

In some embodiments, the rapid thermometer is signally coupled to the heat capacity output device, and the rapid thermometer directly transmits the measured data to the heat capacity output device.

In some embodiments, the data measured by the rapid thermometer is manually input to the heat capacity output device by an operator.

In some embodiments, the heat capacity output device includes a display for displaying a heat capacity value.

In some embodiments, the control device is a computer.

In some embodiments, the heat capacity output device is a computer.

In some embodiments, the control device and the heat capacity output device are the same computer.

In some embodiments, the sample includes a thin film and a substrate, the thin film covering a surface of the substrate, and the laser is irradiated onto the film.

The second aspect of the invention provides a method for rapid measurement of heat capacity of a film material, in particular, the method comprises a) providing the apparatus of claim 7, the sample is rapidly heated by a laser, and the temperature of the central portion of the sample is measured by a rapid thermometer;

b) the interface average temperature $T_a$ at the interface between the substrate and the thin film is:

$$T_a = (T_s + T_0)/(2 \ast f a)$$

where $T_s$ is the measured temperature, $T_0$ is the ambient temperature, and $f_a$ is the material correction factor;

c) through the semi-infinite heat transfer formula, calculating the spatial distribution of the temperature T in the thickness direction of the substrate:

$$T(y, \tau) = \mathrm{erf}\left(\frac{y}{2 \ast \sqrt{a\tau}}\right) \ast (T_0 - T_a) + T_a$$

where $$\mathrm{erf}\left(\frac{y}{2 \ast \sqrt{a\tau}}\right)$$

is the residual function, a is thermal diffusion coefficient $$a = \frac{\lambda}{\rho c},$$

y is the depth of the point in the substrate from the contact surface, and τ is the heating time;

d) the energy absorbed by the entire substrate $Q_s$ is calculated by spatial integration of temperature in the thickness direction of the substrate:

$$Q_s = \rho_s C_s A \int_0^H \Delta T_h dh$$

where $\rho_s$ is the density of the substrate, $C_s$ is the heat capacity of the substrate, A is the area of the light spot, and H is the distance of temperature propagation;

e) obtaining temperature $T_m$ and its corresponding time $\tau_m$, and temperature $T_n$ and its corresponding time $\tau_n$; within the time $\tau_m$, the energy absorbed by the substrate is $Q_m$; within the time $\tau_n$, the energy absorbed by the substrate is $Q_n$, wherein the $Q_m$ and the $Q_n$ are calculated by the formula in d;

f) the average heat capacity $c_f$ of the thin film material in the temperature range from $T_m$ to $T_n$ is:

$$c_{f((T_n+T_m)/2)} = \frac{(W * \tau_n - Q_n) - (W * \tau_m - Q_m)}{(T_n - T_m) * \rho * V}$$

where W is the set power of the laser, p is the thin film density, and V is the volume of the laser heated film.

In some embodiments, the material of the substrate is $SiO_2$, and the material correction coefficient $f_a$ of the average interface temperature of the substrate and the thin film contact surface is 0.65 to 0.75.

In some embodiments, the heating time of the laser is 0-1 us.

In some embodiments, preferably, the heating time of the laser is 0-1 ns; more preferably, the heating time of the laser is 0-1 ps.

It is to be understood that within the scope of the present invention, the various technical features of the present invention and the various technical features specifically described hereinafter (as in the embodiments) may be combined with each other to constitute a new or preferred technical solution. Due to space limitations, we will not repeat them here.

BRIEF DESCRIPTION OF THE DRAWINGS

In order to clearly illustrate the embodiments of the present invention or the technical solutions in the prior art, the drawings to be used in the embodiments or the prior art description will be briefly described below. Obviously, the drawings in the following description are only some embodiments of the invention, and other drawings may also be obtained from those ordinary skilled in the art without any creative work.

Figure 1:
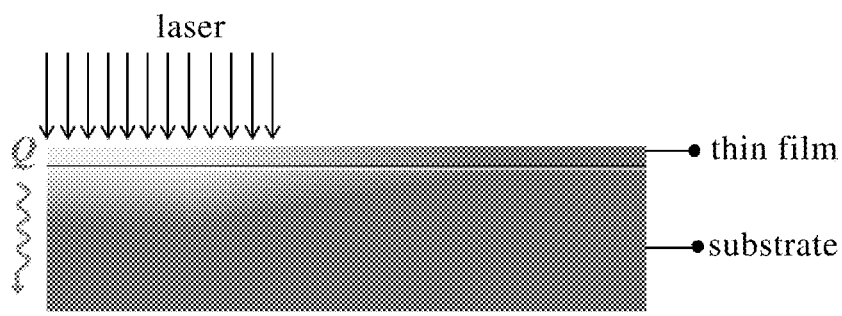
FIG. 1 is a diagram illustrating the laser heating in one embodiment of the present invention.

In each drawing, the labels are as follows:
101—Controlled computer;
102—Clock synchronizer;
103—Laser;
104—Rapid thermometer;
105—Beam expander;
106—Beam shaper;
107—Focusing lens;
108—Sample unit.

DETAILED DESCRIPTION

The inventors have extensively and intensively researched and developed a new apparatus and method for rapid measurement of heat capacity of a thin film material through a large number of screenings. The present invention uses a laser instantaneous heating technique combined with a rapid temperature measuring technique to calculate the heat capacity of the material. The invention has been completed on the basis of this technology.

The present invention provides an apparatus and method for rapid measurement of heat capacity of a film material. The invention combines the laser heating technology with the high-speed temperature measuring technology to realize the measurement of the heat capacity of the thin film material.

Typically, the apparatus for rapid measurement of heat capacity of a thin film material of the present invention triggers a clock synchronizer through a computer control system. The clock synchronizer simultaneously triggers a laser and a temperature acquisition system. The laser light emitted by the laser is expanded, shaped, and gathered to form a spot with uniform spatial energy distribution on the surface of the material. Then the collected temperature data is subjected to calculation processing to obtain the heat capacity of the material.

The method for rapid measurement of heat capacity of a thin film material of the present invention utilizes a laser rapid heating and a high-speed temperature measuring system to quickly obtain the temperature of the surface of the material. The energy absorbed by the substrate is calculated by using equation (7) described below, and the average heat capacity over a certain temperature interval is calculated by using equation (8) described below. When the temperature interval is small enough, it can be considered that the calculated heat capacity is the specific heat capacity at the current temperature.

The thickness of the thin film is generally from ten nanometers to several micrometers. The thickness of the substrate is in the millimeters level. The difference in thickness between the thin film and the substrate is usually up to 2 orders of magnitude or more. Accordingly, approximating the substrate to a semi-infinite model does not change the thermal response of the film during the laser heating process.

After the thin film material is irradiated with laser light, physical processes such as absorption, temperature rise, and heat conduction occur.

(I) The film absorbs the incident laser and heats up: According to the principle of laser heating, the absorption of laser light by the film material satisfies the following formula:

$$\Delta I_a(x) \approx (1-R) I \cdot \delta e^{-\delta x} \quad (1)$$

where x represents the distance from a point in the film to the surface of the film; $\Delta I_a(x)$ represents the absorbed power of the film at a depth of x from the surface of the film; I is the power of the laser reaching the surface of the film; R is the reflectivity of the film; $\delta$ is the absorption coefficient of the film. The thin film is heated up at $\Delta I_a(x)$ power. When the substrate coefficient is negligible (such as low coefficient or thick film), the total heat $Q_a(T)$ absorbed by the film satisfy the formula:

$$Q_a(\tau) = \int_0^d \Delta I_a(x) dx \cdot \tau \quad (2)$$

Where d is the film thickness; $\tau$ is the heating time.

According to the definition of heat capacity or the DSC method, in a case where the heat conduction can be ignored, the heat capacity can be given by the following equation:

$$C_a(T, \tau) \approx \frac{dQ_a(\tau)}{dT(t\tau)} \cdot \frac{1}{\rho V} \approx \frac{(1-R)I \cdot \delta (1-e^{-\delta d})}{\rho V} \left(\frac{dT(t\tau)}{d\tau}\right)^{-1} \quad (3)$$

Where T(t) is the temperature of the film after the heating time t; $\rho$ is the film density; V is the volume of the film heated by the laser.

For solid materials, if the material does not change in shape, it can be approximated that the density and volume of the material are constants that do not change with temperature. So the relationship of the equation is simplified that the heat capacity is only the relationship between energy and temperature.

(II) Heat Conduction:

However, in the process of laser heating and film heating, the heat transfer process to the film region that is not directly heated and to the substrate is inevitable. Therefore, it is necessary to perform heat conduction correction on the equation (3).

Figure 2:
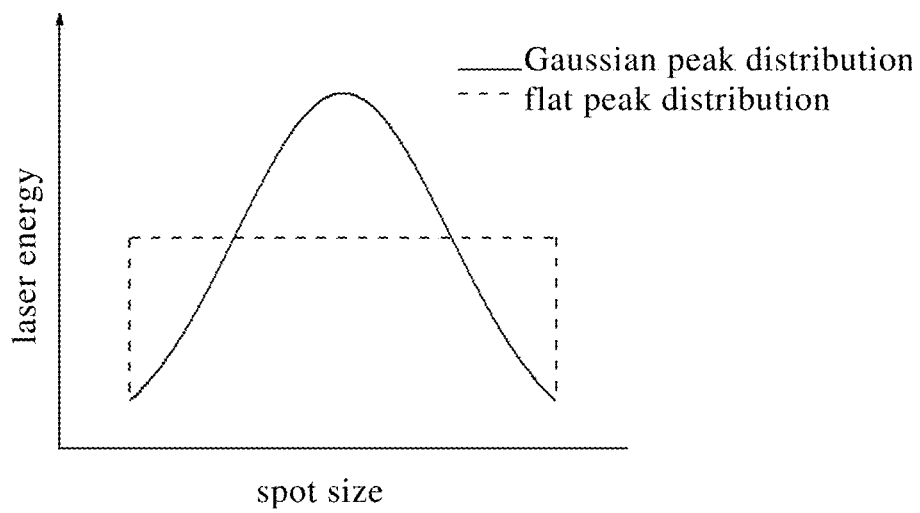
FIG. 2 is a diagram illustrating illustrates the laser spatial light distribution in one embodiment of the present invention.

The energy spatial distribution of the conventional laser is a Gaussian peak as shown by the solid line portion in FIG. 2. When such a laser heats the surface of the film, a spatial temperature distribution as shown by the solid line portion in FIG. 3 is formed.

There is still a radial continuous temperature gradient within the spot of the laser. To improve measurement accuracy, the present invention employs a spatially modulated pulsed laser. Taking the flat peak heating laser (dashed line in FIG. 2) as an example, after heating, the temperature is spatially uniformly distributed on the surface of the material.

Figure 3:
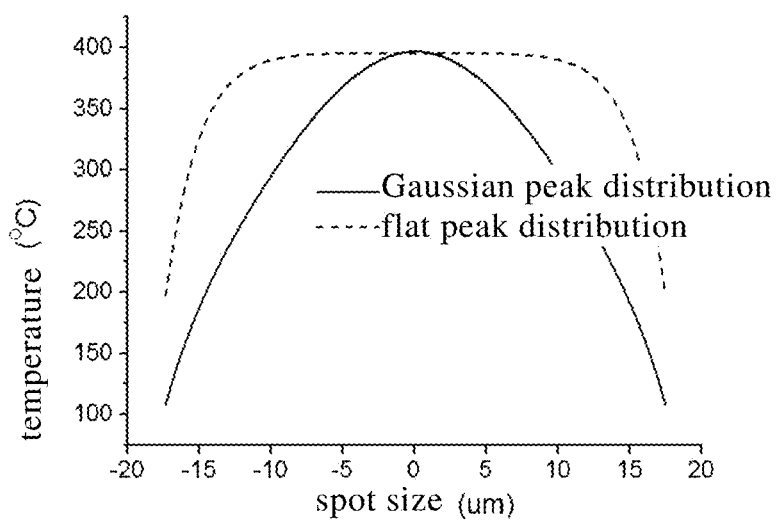
FIG. 3 is a diagram illustrating the spatial distribution of temperature in one embodiment of the present invention.

As shown by the dashed line in FIG. 3, the geometrical distribution of the temperature within the spot after the end of the flat-top peak laser heating is shown. In the figure, it can be seen that the temperature of most spaces is uniform within the range of the spot diameter of 35 um (radius is 17.5 um). There are only some temperature gradient regions at the edge of the laser spot. It can be seen from the dashed line in FIG. 3 that due to the uniformity of the spatial temperature distribution in a specific region, there is no radial temperature propagation (no temperature gradient) at the center point of the laser. That is, by using a flat-top laser to heat the film, a semi-infinite heat conduction model can be formed at the center of the laser.

Assuming that the substrate is in intimate contact with the film, ignoring the contact thermal resistance, the temperature of the contact surfaces of the two materials is the same. If the two materials are identical, the contact surface temperature is:

$$T_a = (T_s + T_0)/2 \quad (4)$$

Where $T_a$ is the average temperature; $T_s$ is the measuring temperature; and $T_0$ is the ambient temperature.

Usually the material properties of the substrate are different from the properties of the coating material, so the average interface temperature at the interface should be multiplied by a material correction factor $f_a$.

$$T_a = (T_s + T_0)/(2 \ast fa) \quad (5)$$

Taking the $SiO_2$ substrate as an example, after calculation, the correction coefficient $f_a$ of the average temperature at the interface between $SiO_2$ and the metal material is between 0.65 and 0.75. The spatial distribution of temperature in the thickness direction of the substrate can be obtained by using the semi-infinite heat conduction formula (6):

$$T(y, \tau) = \text{erf}\left(\frac{y}{2 \ast \sqrt{a\tau}}\right) \ast (T_0 - T_a) + T_a \quad (6)$$

Where $T_a$ is the average temperature of the interface; $T_0$ is room temperature, $$\text{erf}\left(\frac{y}{2 \ast \sqrt{a\tau}}\right)$$

is the residual function, a is thermal diffusion coefficient $$a = \frac{\lambda}{\rho c}.$$

According to formula (6), after calculating the distribution of temperature in the thickness direction of the substrate, the sum of energy $Q_s$ in the entire substrate can be obtained by using equation (7) for spatial integration of temperature in the thickness direction of the substrate.

$$Q_s = \rho_s C_s A \int_0^H \Delta T_h dh \quad (7)$$

where $\rho_s$ is the density of the substrate, $C_s$ is the heat capacity of the substrate, A is the area of the light spot, and H is the distance of temperature propagation.

Assuming that the coating material is pure metal nickel, the film thickness is 20 nm, the substrate is $SiO_2$, and the thickness is 2 mm, the energy absorption ratio of the substrate material can be calculated as shown in Table 1. It can be seen from Table 1 that when the heating time is 1 us, the absorption ratio of the substrate has reached 94%, so to ensure the accuracy of the calculation result, the heating time should be no more than 1 us, otherwise the heat information will be completely covered by the substrate material.

TABLE 1 ratio of absorbed energy by the substrate

| heating time | 1 ps | 10 ps | 100 ps | 1 ns | 10 ns | 100 ns | 1 us |
|---|---|---|---|---|---|---|---|
| energy absorption ratio of the substrate | 0.016 | 0.05 | 0.14 | 0.35 | 0.62 | 0.83 | 0.94 |

Figure 4:
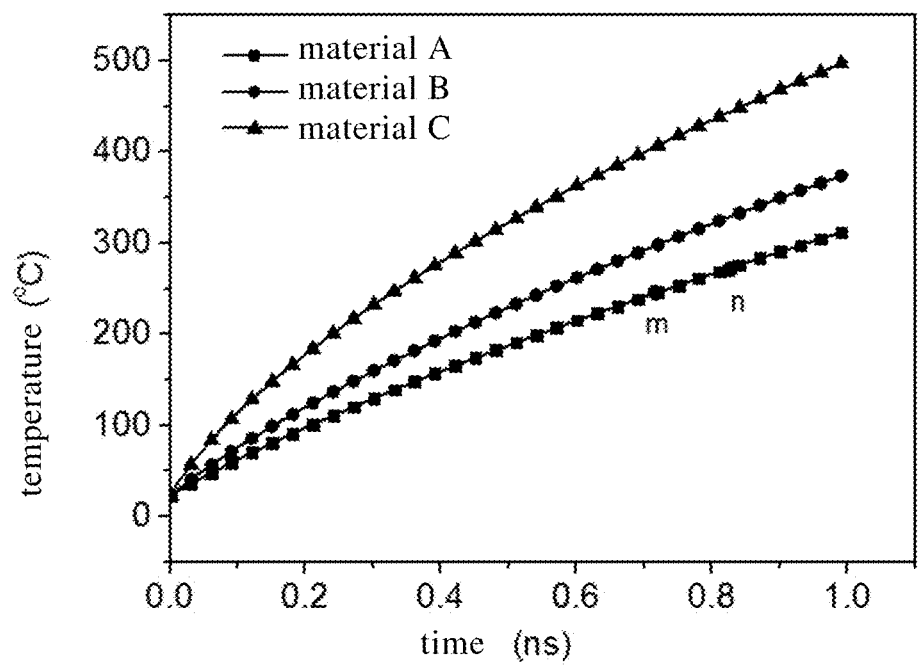
FIG. 4 is a diagram illustrating laser heating temperature graph in one embodiment of the present invention.

FIG. 4 is a graph of the temperature rise due to laser heating, which can be measured using high speed optical temperature measurement techniques. The laser continuously operates at the set power W 100%, the heating time is 1 ns, the three materials A, B, C having different volume heat capacity are heated under the same laser power, the heating processes of the materials are consistent, but the slopes of the heating are different. The larger the slope, the smaller the volumetric heat capacity of the material. Therefore, the thermodynamic behavior of different materials can be clearly characterized by the temperature rise curve. It can be seen from the temperature distribution curve of FIG. 4 that the temperature increases almost linearly proportionally to the heating time in the period of 0 to 1 ns. Assuming that the temperatures $T_m$ and $T_n$ of the two time points m and n in the curve of FIG. 4 can be obtained, and the corresponding times are $\tau_m$ and $\tau_n$. Then the energies $Q_m$ and $Q_n$ absorbed by the substrate at $\tau_m$ and $\tau_n$ can be calculated by the formula (7). Therefore, the average heat capacity in the temperature range $(T_m-T_n)$ is:

$$c_{f((T_n+T_m)/2)} = \frac{(W*\tau_n - Q_n) - (W*\tau_m - Q_m)}{(T_n - T_m)*\rho*V} \quad (8)$$

When m gradually approaches n, the result of equation (8) is the heat capacity of the material at temperature $T_n$.

The main advantages of the invention include:
(a) The structure of the apparatus is simple;
(b) The method is efficient and accurate, and the error of the heat capacity value and the standard heat capacity value output by the apparatus of the invention is within 10%;
(c) Providing reliable parameter data for the thermal properties of various current ultra-thin semiconductor films;
(d) The heat capacity of materials at different temperatures can be measured in real time.

The invention is further illustrated below in conjunction with the specific embodiments. It is to be understood that the examples are not intended to limit the scope of the invention. Moreover, the drawings are schematic and thus the apparatus and devices of the present invention are not limited by the size or proportions of the drawings.

It should be noted that in the claims and the specification of the present patent, relational terms such as first and second, etc. are merely used to distinguish one entity or operation from another entity or operation. It does not necessarily require or imply any such actual relationship or order between these entities or operations. Furthermore, the term "comprises" or "include" or any other variations thereof is intended to encompass a non-exclusive inclusion. Thus, a process, method, article, or device that comprises a plurality of elements includes not only those elements but also other elements that are not explicitly listed, or elements that are inherent to such a process, method, article, or device. An element that is defined by the phrase "comprising a" does not exclude the presence of the same element in the process, method, item, or device that comprises other identical elements.

In addition, the laser spot size, heating temperature and time described herein are only used as illustrations. The laser spot size, heating temperature and time of action included in this disclosure are not limited to the parameter values specified in the patent.

EMBODIMENTS

Figure 5:
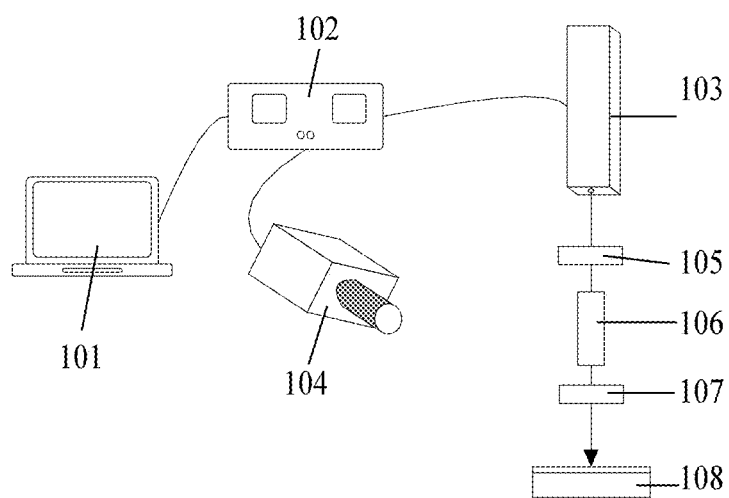
FIG. 5 is a schematic structural view of the apparatus in one embodiment of the present invention.

The apparatus for rapid measurement of heat capacity of the thin film material of this embodiment is shown in FIG. 5. FIG. 5 shows the measurement process of the heat capacity of the material. The computer control center 101 sends a start signal to the clock synchronizer 102 to ensure that the start of the laser 103 and the rapid thermometer of the 104 coordinate with each other. After the laser light emitted by the laser 103 passes through the beam expander 105, the laser light intensity is reduced. After the laser beam passes through the beam shaper, the Gaussian spatial distribution of the laser energy shown as the solid line in FIG. 2 is re-shaped to the flat peak distribution shown as a dotted line in FIG. 2. The laser light emitted from the beam shaper 106 passes through the focusing lens 107 and is irradiated onto the surface of the sample. The rapid thermometer 104 captures the surface temperature of the sample at a certain point in time during the heating of the sample. After obtaining the temperature measurement time point t and the obtained measured temperature Ts, the heat capacity of the thin film material is directly calculated by inputting the measured parameters in the heat capacity calculation software.

Figure 6:
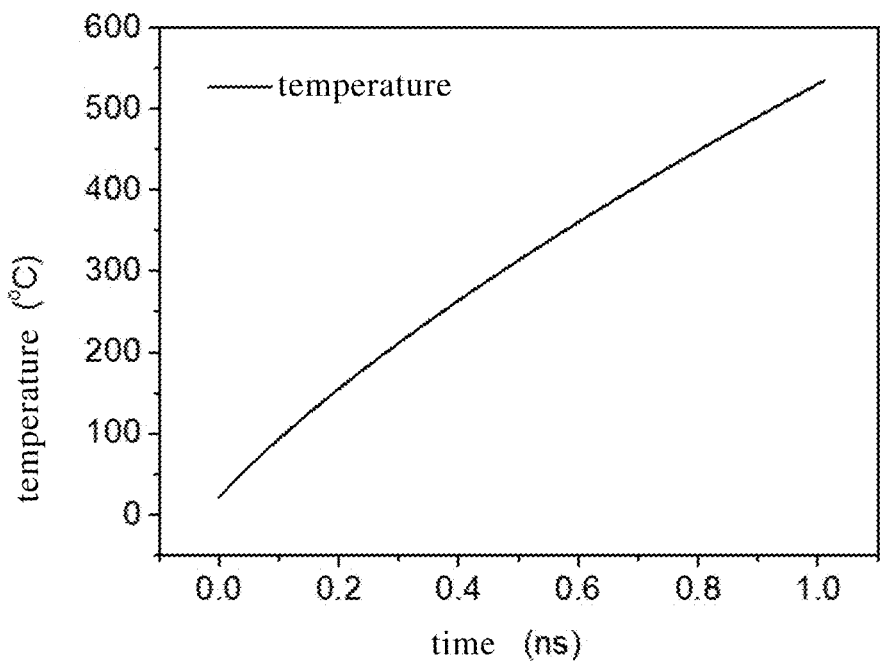
FIG. 6 is a diagram illustrating laser heating temperature graph in one embodiment of the present invention.
Figure 7:
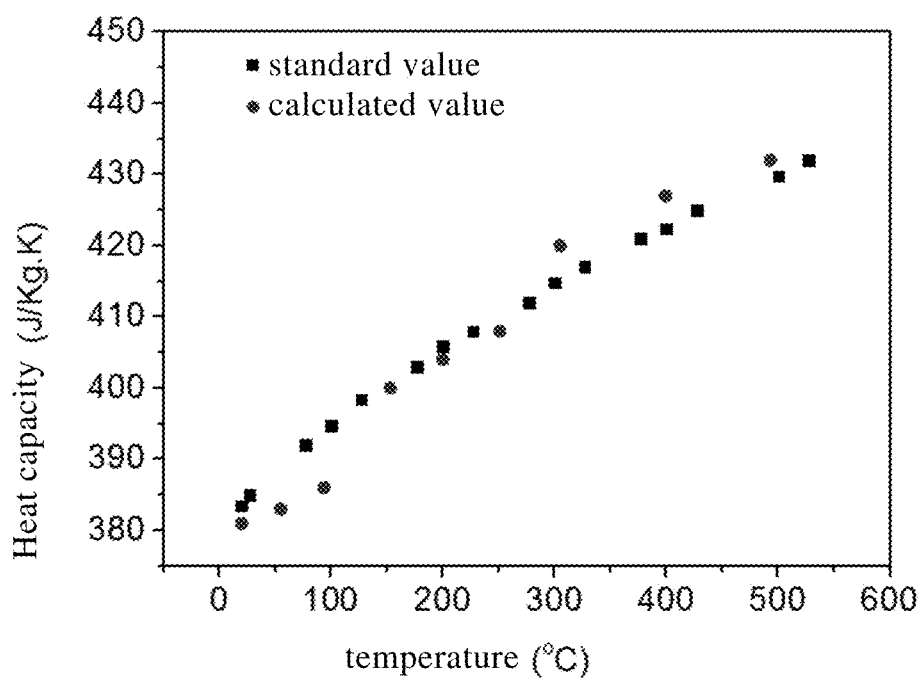
FIG. 7 is a comparison diagram of heat capacity values of the thin films in one embodiment of the present invention.

A laser beam of energy of 3.0E+12 mW/mm$^3$ was irradiated onto a copper film having a thickness of 20 nm, and the substrate of the film was $SiO_2$. As shown in FIG. 6, within 1 ns, the temperature of the surface of the material rises rapidly to 550° C., and the temperature rise data is simultaneously acquired. The collected data is analyzed by using the methods of formula (7) and formula (8) to obtain the calculation result as shown in FIG. 7. The difference between the standard heat capacity value and the heat capacity value of the device of the present invention are within 10%, indicating that the apparatus for rapid measurement of heat capacity of the thin film material of the present invention has a relatively high accuracy.

All documents mentioned in the present application are incorporated herein by reference, just as each document is cited separately as a reference. In addition, it should be understood that various modifications and changes may be made by those skilled in the art. These equivalent forms are also within the scope defined by the claims appended hereto.

What is claimed is:

1. An apparatus for rapid measurement of a heat capacity of a thin film material, characterized in that the apparatus comprises a control device, a clock synchronizer, a flat peak laser device, a rapid thermometer and a heat capacity output device;
   wherein the control device and the clock synchronizer are signally connected, and the clock synchronizer is signally connected to the flat peak laser device and the rapid thermometer;
   wherein the control device is configured to send a start signal to the clock synchronizer, and the flat peak laser device and the rapid thermometer are configured to coordinately cooperate; the flat peak laser device is configured to emit a laser beam with a spatially flat peak on a surface of a sample to heat the sample, wherein the sample includes the thin film material and the laser is irradiated onto the thin film material; and the rapid thermometer is configured to measure a surface temperature of the sample at a plurality of points in time during the heating of the sample, and to input the measured surface temperature into the heat capacity output device to obtain the heat capacity of the thin film material.

2. The apparatus of claim 1, characterized in that the rapid thermometer is signally coupled to the heat capacity output device, and the rapid thermometer directly transmits the measured surface temperature to the heat capacity output device.

3. The apparatus of claim 1, characterized in that the heat capacity output device includes a display for displaying a heat capacity value.

4. The apparatus of claim 1, characterized in that the control device and the heat capacity output device are a same computer.

5. The apparatus of claim 1, characterized in that the flat peak laser device comprises a laser, a beam expander, a beam shaper, and a focusing lens.

6. The apparatus of claim 5, wherein the laser beam is emitted from the laser device, the laser beam first passes through the beam expander, wherein when a light intensity of the laser beam is reduced, and then the laser beam passes through the beam shaper, wherein an energy spatial distribution of the laser beam is shaped from a Gaussian spatial distribution to a flat peak spatial distribution, and the laser beam finally passes through the focusing lens and illuminates the surface of the sample.

7. The apparatus of claim 1, characterized in that the sample further includes a substrate, the thin film material covering a surface of the substrate.

8. A method for rapid measurement of a heat capacity of a thin film material, characterized in that the method comprises a) providing the apparatus of claim 7, wherein the sample is rapidly heated by the laser beam, and a surface temperature of a central portion of the sample is measured at the plurality of points in time by the rapid thermometer;

b) for each point in time, calculating an interface average temperature $T_a$ at an interface between the substrate and the thin film by:

$$T_a = (T_s + T_0)/(2 * f_a)$$

where $T_s$ is the measured surface temperature, $T_0$ is an ambient temperature, and $f_a$ is a material correction factor;

c) for each point in time, through a semi-infinite heat transfer formula, calculating a spatial distribution of a temperature T in a thickness direction of the substrate:

$$T(y, \tau) = \text{erf}\left(\frac{y}{2*\sqrt{a\tau}}\right) * (T_0 - T_a) + T_a$$

where $$\text{erf}\left(\frac{y}{2*\sqrt{a\tau}}\right)$$

is a residual function, a is a thermal diffusion coefficient, y is a depth of a position in the substrate from the interface between the substrate and the thin film, and $\tau$ is a heating time corresponding to the point in time;

d) for each point in time, calculating an energy absorbed by the substrate $Q_s$ by a spatial integration of temperature in the thickness direction of the substrate:

$$Q_s = \rho_s C_s A \int_0^H \Delta T_h dh$$

where $p_s$ is a density of the substrate, $C_s$ is the heat capacity of the substrate, A is an area of the laser beam, and H is a distance of temperature propagation;

e) obtaining a temperature $T_m$ and its corresponding heating time $\tau_m$, and a temperature $T_n$ and its corresponding heating time $\tau_n$; wherein within the heating time $\tau_m$, an energy absorbed by the substrate is $Q_m$; wherein within the heating time $\tau_n$, an energy absorbed by the substrate is $Q_n$, wherein the $Q_m$ and the $Q_n$ are calculated by the formula in step d;

f) calculating an average heat capacity $c_f$ of the thin film material in a temperature range from $T_m$ to $T_n$ by:

$$c_{f((T_n+T_m)/2)} = \frac{(W*\tau_n - Q_n) - (W*\tau_m - Q_m)}{(T_n - T_m)*\rho*V}$$

where W is a set power of the laser, p is a density of the thin film, and V is a volume of the film that is heated by the laser beam.

9. The method of claim 8, characterized in that the material of the substrate is $SiO_2$, and the material correction factor $f_a$ of the interface average temperature of the substrate and the thin film interface is 0.65 to 0.75.

10. The method of claim 8, characterized in that the heating time of the laser is 0-1 µs.

* * * * *